United States Patent
Codognotto et al.

(10) Patent No.: US 9,944,056 B2
(45) Date of Patent: Apr. 17, 2018

(54) DEVICE FOR HEATING AND CONNECTING SHEETS OF BITUMINOUS OR SYNTHETIC MEMBRANES AND A BITUMINOUS OR SYNTHETIC MEMBRANE THEREOF

(71) Applicant: GENERAL MEMBRANE S.P.A., Ceggia (VE) (IT)

(72) Inventors: Lionello Codognotto, Salgareda (IT); Michele Drigo, Treviso (IT)

(73) Assignee: GENERAL MEMBRANE S.P.A., Ceggia (VE) (IT)

( * ) Notice: Subject to any disclaimer, the term of this patent is extended or adjusted under 35 U.S.C. 154(b) by 527 days.

(21) Appl. No.: 14/388,235

(22) PCT Filed: Mar. 26, 2013

(86) PCT No.: PCT/IT2013/000089
§ 371 (c)(1),
(2) Date: Sep. 25, 2014

(87) PCT Pub. No.: WO2013/144987
PCT Pub. Date: Oct. 3, 2013

(65) Prior Publication Data
US 2015/0114570 A1 Apr. 30, 2015

(30) Foreign Application Priority Data
Mar. 26, 2012 (IT) ................. VI2012A0068

(51) Int. Cl.
*B32B 37/06* (2006.01)
*E04D 5/12* (2006.01)
(Continued)

(52) U.S. Cl.
CPC .......... *B32B 37/06* (2013.01); *B32B 37/0046* (2013.01); *B32B 38/0008* (2013.01);
(Continued)

(58) Field of Classification Search
CPC ............................ B32B 37/06; B32B 37/0046
See application file for complete search history.

(56) References Cited

U.S. PATENT DOCUMENTS 4,978,825 A * 12/1990 Schmidt ............ B29C 66/83413
156/274.2
5,526,624 A * 6/1996 Berg ..................... B29C 65/364
156/304.4
(Continued)

FOREIGN PATENT DOCUMENTS

CN 102317376 A 1/2012
DE 4311947 A1 6/1994
(Continued)

OTHER PUBLICATIONS

International Search Report in corresponding PCT application dated Aug. 1, 2013.
English Abstract of CN 102317376 A dated Jan. 11, 2012.

*Primary Examiner* — Daniel McNally
(74) *Attorney, Agent, or Firm* — Hedman & Costigan, P.C.; James V. Costigan; Kathleen A. Costigan

(57) ABSTRACT

A device for heating and connecting sheets (11, 12, 111, 121) of bituminous or synthetic membranes (100), comprising at least one sheet (11, 12, 111, 121) of a bituminous or synthetic membrane (100) which is applied to at least one base layer (141), said membrane (100) being formed with a single compound or having at least one bottom layer including a compound or a bituminous mixture and at least one upper layer including a polymeric material and an electrically conductive material, which is heated; in particular, a body (13, 23) having a mainly longitudinal (A) development and placed on a first edge (11a, 21a) of a first sheet (11, 21, 111, 121) of the membrane (100) in order to connect said first (Continued)

edge to a second edge (12a, 22a) of a second sheet (12, 22, 111, 121) of the membrane (100) is provided with an upper face (13a, 23a).

5 Claims, 4 Drawing Sheets

(51) Int. Cl.
 *E04D 5/14* (2006.01)
 *E04D 15/04* (2006.01)
 *B32B 37/00* (2006.01)
 *B32B 38/00* (2006.01)

(52) U.S. Cl.
 CPC ............... *E04D 5/12* (2013.01); *E04D 5/142* (2013.01); *E04D 5/146* (2013.01); *E04D 5/149* (2013.01); *E04D 15/04* (2013.01)

(56) References Cited

U.S. PATENT DOCUMENTS

| | | | |
|---|---|---|---|
| 2003/0124292 A1 | 7/2003 | Unterreiter | |
| 2009/0311506 A1* | 12/2009 | Herbeck | B29C 70/025 |
| | | | 428/297.4 |
| 2011/0016811 A1 | 1/2011 | Kalkanoglu | |

FOREIGN PATENT DOCUMENTS

| | | |
|---|---|---|
| EP | 1130186 A2 | 9/2001 |
| WO | 9318247 A1 | 9/1993 |
| WO | 2004015216 A1 | 2/2004 |

* cited by examiner

DEVICE FOR HEATING AND CONNECTING SHEETS OF BITUMINOUS OR SYNTHETIC MEMBRANES AND A BITUMINOUS OR SYNTHETIC MEMBRANE THEREOF

The present invention generally relates to a device for heating and connecting sheets of bituminous or synthetic membranes and a bituminous or synthetic membrane thereof.

In particular, the connection device is intended to be used for connecting sheets of bituminous or synthetic membranes so as to make waterproof covers, for example covers of roofs or covers of building foundations; the device is also usable especially for connecting the side edge of a first sheet of a synthetic or bituminous membrane, known as selvage or selvedge, to the selvage of a second sheet of the bituminous or synthetic membrane.

The device can be used for connecting both the head edges and the tail edges of two sheets of a bituminous or synthetic membrane by means of electric heating or by electromagnetic induction; in the latter case, an electrically conductive material (preferably a ferromagnetic material) is activated using a suitable inductor device that is moved over the surface of the membrane to be heated; it is thus possible to connect the sheets of a bituminous or synthetic membrane without flame and with total or partial grip, thanks to the overlaps consolidation, so as to make waterproofing covers or roofings, for example covers of roofs or covers of building foundations.

Therefore, the present invention relates to the construction industry and particularly to the production and installation of bituminous or synthetic membranes for roofing, as well as to the related fittings.

Nowadays, it is known the need to obtain an efficient watertight connection between sheets of bituminous or synthetic membranes, which can be arranged side by side and/or partially overlapped so as to form a waterproof cover.

A first known method for connecting sheets of bituminous or synthetic membranes is carried out by heating said sheets with flame.

Said method involves firstly to overlap the parallel edges of the sheets of a bituminous or synthetic membrane and, then, to heat said edges with a flame in order to weld them one to another, as a result of a vulcanization of the bituminous or synthetic material.

Said first method has some heavy drawbacks. Firstly, it requires a long processing time or a large number of operators to weld the sheets.

In fact, the flame which is used to heat the edges of the sheets is focused on a prefixed point and therefore said flame must be moved along the edge for gradually welding said edge along its length.

Moreover, said first method has the drawback that the bituminous or synthetic material, which constitutes the sheets to be joined, deteriorates when affected by the flame, thus jeopardizing its efficiency as a sealing element.

Furthermore, the bituminous material which is affected by the flame is able to catch fire and therefore said first method is also dangerous, due to the possible fire of the membranes; in fact, many european states have even restricted or prohibited the welding of the bituminous or synthetic membranes with flame.

A second known method for connecting sheets of bituminous or synthetic membranes provides for replacing the flame with a hot air flow to heat the sheets edges to be welded.

Although this second method prevents fire risks of the above described first method, it has the same drawback of requiring high working time and/or a large number of operators.

Self-adhesive membranes which can be connected without flame are also known.

Said self-adhesive membranes are made of a mixture of bituminous or synthetic material with high adhesive power and are equipped with a film that covers their faces to prevent accidental adhesion to foreign bodies or between the turns of the membrane itself when the membrane is rolled up.

Therefore, the sheets of said known adhesive membranes are positioned on the roof, firstly by removing the film and then by overlapping the edges of each sheet with the edges of another sheet.

Thus, flames or other heat sources are not required for at least most of the covering installation steps.

However, the above mentioned technical solutions have a drawback relating to the tightness of the lateral and headed overlapping (which constitute critical areas where water leakages are possible), especially at low operating temperatures (in particular, at temperatures below 10° C., as the self-adhesive portion of the membrane, at said temperatures, loses its adhesion and sealing features).

To overcome this drawback, it is possible to heat up the edges by flame or by means of air flows, but this process causes the drawbacks of the above mentioned first and second known welding methods, also by using said self-adhesive membranes.

The problem underlying the present invention is therefore to obtain the welding of the edges of sheets of bituminous or synthetic membranes more quickly and safely than in the prior art methods or than using the known self-adhesive membranes.

A primary aim of the present invention is to provide a connection device for sheets of bituminous or synthetic membranes and a bituminous or synthetic membrane therefrom, which are able to solve the above mentioned technical problem by obviating the mentioned drawbacks.

Within this aim, it is an object of the present invention to propose a connection device and a bituminous or synthetic membrane therefrom, which allows to obtain a strong and reliable consolidation of the sheets overlaps, with respect to the prior art.

Another object of the invention is to provide a connection device and a bituminous or synthetic membrane therefrom, which allow to avoid any risk of fire and/or pollutant emissions during the laying of the waterproofing membrane and/or any deterioration of the bituminous or synthetic mixture during installation and later on.

A further object of the present invention is to provide a bituminous or synthetic membrane, which can be heated and connected through the above mentioned device, in order to achieve a totally waterproof mantle, also in correspondence of the overlaps and in any climatic condition.

The above mentioned aims and other objects that will become better clear hereinafter are achieved by a connection device for sheets of bituminous or synthetic membranes and by a bituminous or synthetic membrane thereof comprising a connection device.

Further technical details of the connection device and the membrane comprising a connection device according to the invention are shown in the corresponding dependent claims.

Particularly, according to a first embodiment of the invention, the connection device described herein includes:

a body having a mainly longitudinal development, which can be overlaid to or intergrated in a first edge of a first sheet of a membrane, so as to connect the latter to a second edge of a second sheet of the membrane;

at least two electric resistors, forming branches of an electrical circuit, which are mechanically connected to said body and having a mainly longitudinal development, as the above mentioned body, in order to heat the edges of the sheets of bituminous or synthetic membranes for welding said edges to each other.

Using the power supply of the heating resistors and the consequent heating due to the Joule effect, it is possible to weld the overlapping edges of two sheets of a membrane, thus obtaining a fast and safe welding.

Said welding is obtained substantially simultaneously along the whole length of the edges of the sheets. Moreover, the use of a connection device according to the invention avoids the use of flames and therefore prevents the risk of fire or deterioration of the bituminous mixture of said membrane.

Moreover, the bituminous material constituting the sheets acts itself as an electrical insulator and therefore prevents the possibility of electric shocks and other accidents that may happen to the operators.

Advantageously, the connection device of the invention has a substantially flat upper face on which the electric resistors are fixed, so that the resistors are interposed between the overlapping edges of two sheets of a bituminous or synthetic membrane and therefore the thermal power generated by said resistors is equally transmitted to both said overlapping edges to be welded, thus obtaining an optimum welding of said edges.

Said resistors are preferably made from a material chosen between an electrically conductive paste, an electrically conductive metallic material and an electrically conductive ink and, advantageously, said upper face consists of or is coated with adhesive material so that it adheres to an edge of a membrane sheet by simple contact, thus obtaining an excellent contact in order to have a suitable heat transmission between said edge and the electrical resistors.

The connection device according to the present invention preferably also comprises a film covering the upper face of the body, capable of being removed from the upper face, so that said face contacts the edge of a membrane sheet, in order to avoid the accidental adhesion of the upper face to other bodies before its use.

In a preferred, but not exclusive, embodiment of the invention, the body of the connecting device is preferably also equipped with a lower face, opposite to the upper face and consisting of or covered with adhesive material, so as to be mechanically connected to the first edge of a first bituminous or synthetic membrane.

More in detail, according to said embodiment of the invention, the body is constituted by a film of polymeric material which can be chemically connected with the bituminous material.

Thus, the connection device according to the invention can easily be interposed and thermally welded (after having powered the electrical resistors) to the overlapping edges (headed, tailed or lateral edges) of two sheets of a membrane.

A connection device according to said embodiment of the invention allows for a particularly flexible use, as the above mentioned device can be placed into contact, from time to time, with the elements to be welded.

According to other preferred, but not exclusive, embodiments of the invention, the body of the connection device is advantageously integrated with the first edge of a bituminous or synthetic membrane, so as to connect said first edge to the second edge of a second sheet of a bituminous or synthetic membrane.

Said embodiment of the invention has a connecting device with a body which is preferably constituted by a mixture of elastomeric material and "Hot-Melt" resins, with a vulcanization temperature substantially between 40° C. and 80° C., so that, when the body is heated by the electrical resistors, said body is welded by vulcanization to the edge of the second sheet (overlaying said second sheet).

Therefore, it is particularly simple to perform a complete connection of sheets of the bituminous or synthetic membranes (the connecting device of the present invention is integrated with said sheets), as it is possible to place said sheets by overlaying the first edge of each sheet to the second edge of another sheet and by powering the electrical resistors in order to thermally weld said edges to one another (by heating said edges at a temperature of about 50° C.).

According to other embodiments of the invention, the waterproofing membrane according to the invention can be constituted by a mixture or compound or the surface of said membrane can be sprinkled, at least partially, of ferrous material (powder, foil, grid, etc.) or other ferromagnetic material.

In particular, according to preferred embodiments of the invention, as ferromagnetic material, a flexible electrical conductor which produces heat when it is heated by a suitable inductor, thanks to the electromagnetic induction effect, is used.

Said flexible electrical conductor is suitably dimensioned and applied to the whole or part of the surface of each sheet of the membrane and it is heated by a specific apparatus comprising an inductor device, a generator and a control circuit.

As said, therefore, the heating takes place via an inductor device, which is practically constituted by a solenoid, within which an electric current variable in time (such as, for example, an alternating current) flows; the electric current flowing in the solenoid therefore causes a magnetic field, which is time variable in time because the electrical current is time variable.

According to the Faraday law, a time variation of the magnetic field flux causes an induced electromotive force and said electromotive force gives rise to electrical currents (the so-called eddy current) if the electrical resistance is low enough.

Said induced currents flow in the ferromagnetic material of the bituminous or synthetic membrane and, by Joule effect, are able to dissipate energy in the form of heat, so that said membrane, which is subjected to the action of the inductor device, is heated, thus allowing a partial or total adhesion to the structure below, as well as the overlapping consolidation between the sheets of said membrane.

In fact, said heating raises the temperature of the compound of said membrane up to a temperature value which is required to melt the compound portion which is placed next to the electrical conductor, thus substantially replacing all the other known methods, such as propane gas flame or hot air.

Finally, the embodiment of the present invention allows to completely remove any errors due to the operator expertise, while maintaining a quick and reliable installation of the membrane.

The object of the present invention also includes a bituminous or synthetic membrane thereof.

Further characteristics and advantages of the invention will become clear from the description of preferred embodiments of the connection device and the membrane comprising such a connection device according to the invention, which are shown by way of non-limitative examples in the enclosed drawings, in which.

Figure 1:
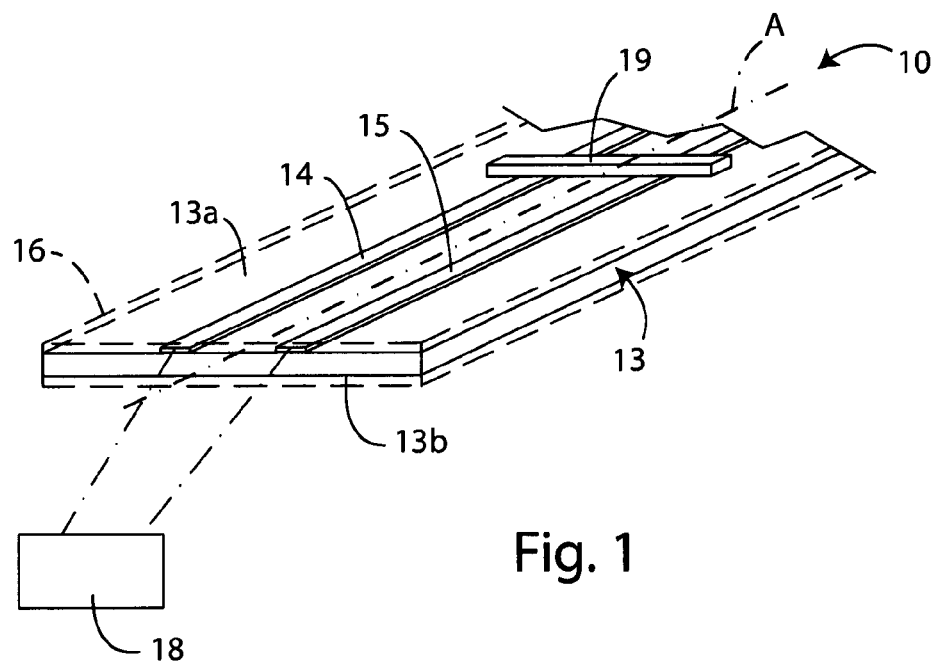
FIG. 1 shows a schematic and assonometric view of a connection device according to a first embodiment of the invention.

According to a first embodiment of the heating and connecting device of the present invention and with particular reference to figures from 1 to 5, a first connection device for sheets 11 and 12 of bituminous or synthetic membranes is generally indicated with 10, while a bituminous or synthetic adhesive membrane is generally indicated with 100 and comprises a connection device according to the invention, said connection device being generally indicated with 20.

Said connection devices 10 and 20 can be used for connecting the sheets 11 and 12 or 21 and 22 of a bituminous or synthetic membrane for making waterproof covers, for example of roofs and building foundations.

Said connection devices 10 and 20 are also preferably usable for connecting a first side edge 11a, 21a of a first sheet 11, 21 of a membrane to the second edge 12a, 22a of a second sheet 12, 22 of the membrane, said edges being headed and/or tailed edges of the sheets 11, 12, 21, 22.

According to the present invention, the connection device 10 or 20 of the sheets 11 and 12 or 21 and 22 of a synthetic or bituminous membrane includes the following technical features:

a body 13, 23 having a mainly longitudinal development (direction A), which can be overlapped to or integrated with a first edge 11a, 21a of a first sheet 11, 21 of a bituminous or synthetic membrane, so as to connect said first edge to a second edge 12a, 22a of a second sheet 12, 22 of the membrane;

two electrical resistors 14, 15, forming branches of an electrical circuit, which are mechanically connected to the body 13, 23 and which have a mainly longitudinal development (according to the A direction) of the body 13, 23.

The body 13, 23 is provided with an upper face 13a, 23a which is substantially flat and on which electrical resistors 14, 15 are fixed; said resistors 14, 15 are preferably made of a material chosen between an electrically conductive paste, an electrically conductive metallic material, for example copper or aluminum, and an electrically conductive ink.

The upper face 13a, 23a is constituted by or is coated with adhesive material so as to be easily attachable to the second edge 12a, 22a of a second sheet 12, 22.

Figure 3:
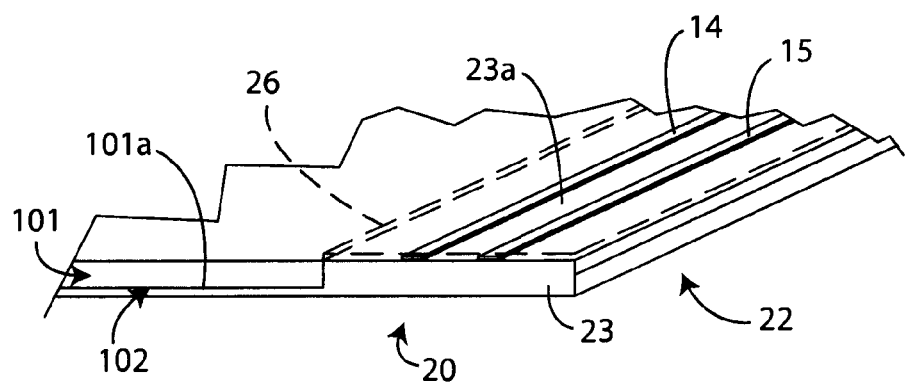
FIG. 3 shows a schematic and assonometric view of a technical detail of a synthetic or bituminous membrane comprising a connection device according to one embodiment of the invention, said detail corresponding to a edge of said bituminous or synthetic membrane.

Furthermore, as shown in FIGS. 1 and 3, each of said connection devices 10, 20 comprises a film 16, 26 for covering the upper face 13a, 23a, said film being removable from said upper face so that the upper face contacts the second edge 12a, 22a.

Figure 2:
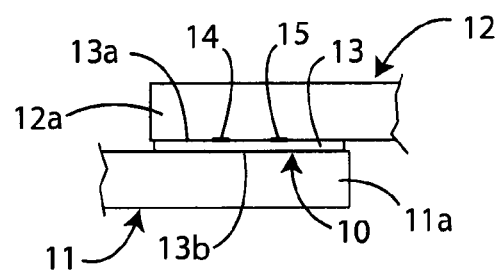
FIG. 2 shows a front view of the connecting device of FIG. 1 in an operating position.

According to a first embodiment of the invention, which is shown in the FIGS. 1 and 2, the body 13 is provided with a lower face 13b, opposite to the upper face 13a and composed of or coated with adhesive material; said lower face is also advantageously coated with an anti-adhesion film, indicated with 17 in FIG. 1, which is removable from the lower face 13b to allow adhesion of said lower face to the first edge 11a of the first sheet 11 of the bituminous or synthetic membrane.

Practically, the films 16 and 17 are used for covering the faces 13a and 13b to prevent adhesion of said faces to other bodies.

Preferably, said films 16 and 17 are made of a material which may poorly adhere to said adhesive material of said faces 13a and 13b.

In more detail, the body 13 is constituted by a film of polymeric material, preferably polyester, which is capable of chemically connecting, after heating, with the synthetic or bituminous material of the sheets 11 and 12.

In order to connect two sheets 11 and 12 of a bituminous or synthetic membrane, the connection device 10 of FIGS. 1 and 2 is overlapped to the first edge 11a of the first sheet 11, to which is connected through the adhesive material covering the lower face 13b of the body 13.

The resistors 14 and 15 are also electrically connected to each other and connected to a power supply 18 ao as to form an electrical circuit.

Preferably, the connection between the resistors 14 and 15 is made by means of a bar 19, made of electrically conductive material, which is placed between the resistors 14 and 15.

Advantageously, said bar 19 is placed in proximity to a first end of the longitudinal body 13, while the power supply 18 is connected to the resistors 14 and 15 near the second end of the longitudinal body 13, so as to obtain the heating of the resistors 14 and 15 for the whole length of the body 13.

Subsequently, the film 16 is removed from the upper face 13a of the body 13 and the first edge 11a, together with the connection device 10, is covered by the second edge 12a of the second sheet 12.

The upper face 13a therefore adheres and is connected to the second edge 12a.

The activation of the power supply 18 powers the resistors 14 and 15, which, by Joule effect, heat the first and second edges 11a and 12a by welding together due to the vulcanization of their material.

Alternatively, in accordance with a second embodiment of the invention, illustrated by way of example in the figures from 3 to 5, the body 23 is integrated with the first edge 21a of a first sheet 21 of the membrane 100, in order to connect said first edge to the second edge 22a of a second sheet 22 of the membrane 100.

The body 23 is preferably made of a mixture of elastomeric material and "Hot-Melt" resins and has a vulcanization temperature substantially between 40° C. and 80° C., so as to be welded for vulcanization to said second edge 22a after heating it to a temperature of about 50° C.

In other words, said second embodiment of the invention consists of a bituminous or synthetic membrane 100, preferably a self-adhesive membrane, which comprises a main layer 101 made of a bituminous or synthetic material and an adhesive layer 102 made of a bituminous or adhesive synthetic material, which covers a face 101a of the main layer 101 and comprising at least one first edge 21a, projecting beyond the side edge 101a of the main layer 101 and capable of being connected with a second edge 22a of a second sheet 22 of the membrane 100.

Figure 4:
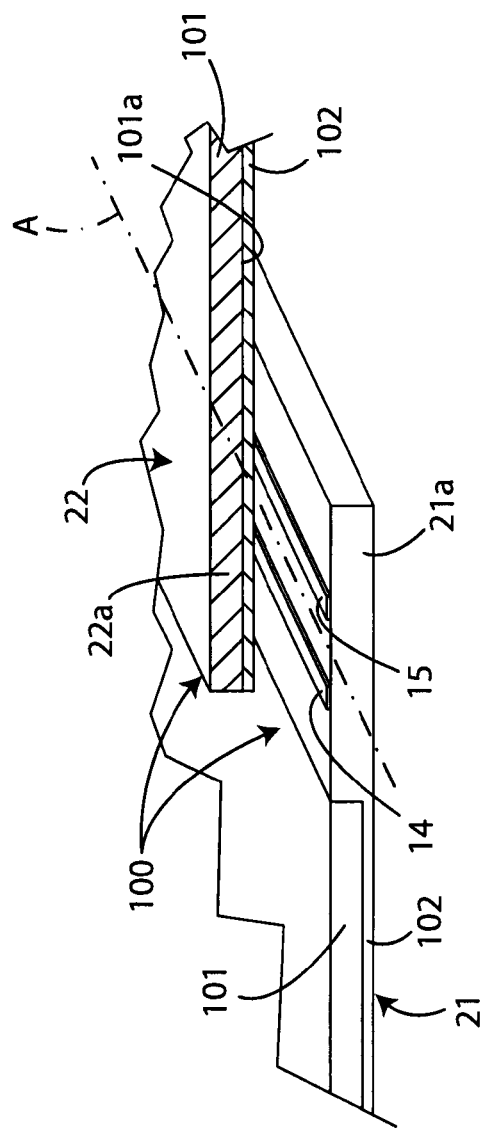
FIG. 4 shows an assonometric view of the technical detail of the membrane of FIG. 3 which is joined to a further adhesive bituminous or synthetic membrane (shown in a partial sectional view)
Figure 5:
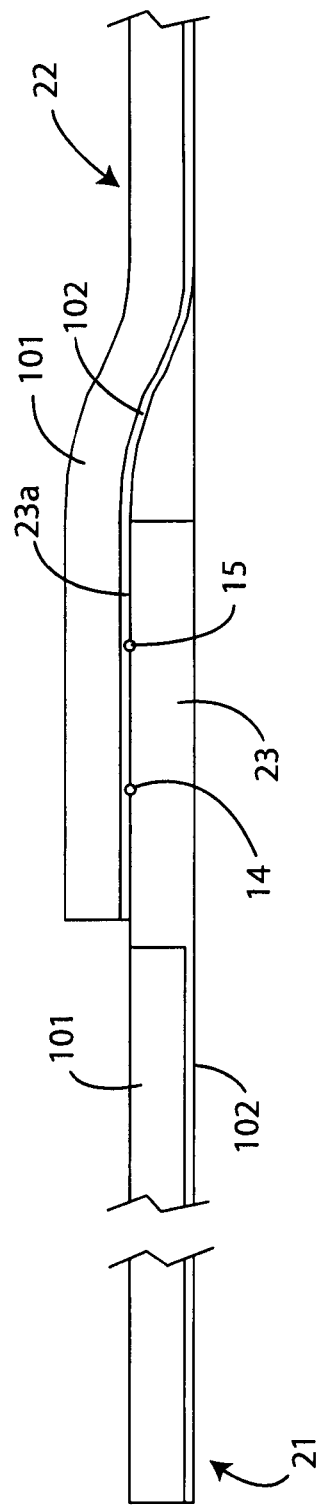
FIG. 5 shows a front view of another embodiment of the membrane of FIGS. 3 and 4, together with a further bituminous or synthetic membrane.

Said synthetic or bituminous membrane 100, according to the above mentioned second embodiment of the present invention, comprises a connection device 20, which, as shown in FIGS. 3, 4 and 5, comprises:

- a body 23 having a mainly longitudinal development (direction A) and which is integrated with the first edge 21a;
- two electrical resistors 14 and 15 forming branches of an electrical circuit, which are mechanically connected to the body 23 and which extend along said longitudinal direction A of the body 23.

The upper face 13a, 23a is substantially flat and the electrical resistors 14 and 15 are fixed on said face; said resistors are made from a material chosen from an electrically conductive paste, an electrically conductive metallic material and an electrically conductive ink.

Even in this second embodiment of the invention, the upper face 13a, 23a is constituted by or coated with adhesive material and is covered with a film 26, which may prevent an accidental adhesion of the upper face 23a to another body before laying the membrane.

Said film 26 is easily removable from the upper face 13a, 23a so that the face is able to contact the edge 22a of a sheet 22 of a synthetic or bituminous membrane 100.

In order to weld the two sheets 21 and 22 of the bituminous or synthetic membrane 100, the operator removes the film 26 from the upper face 23a of the body 23 of the first sheet 21.

Afterwards, the electrical resistors 14 and 15 are connected to a power supply, not shown, so as to form a closed electrical circuit.

Advantageously, the operator may place a bar, made of an electrically conductive material, between the resistors 14 and 15; said bar, which is not shown, may be for example similar to the bar 19.

Then, the operator covers the first edge 21a with the second edge 22a so that the second edge is able to adhere to the upper face 23a of the first edge.

Subsequently, by operating the electric power supply, the edges 21a and 22a are heated, by Joule effect, by means of the electrical resistors 14 and 15 and therefore said edges can be welded by vulcanization.

Figure 8:
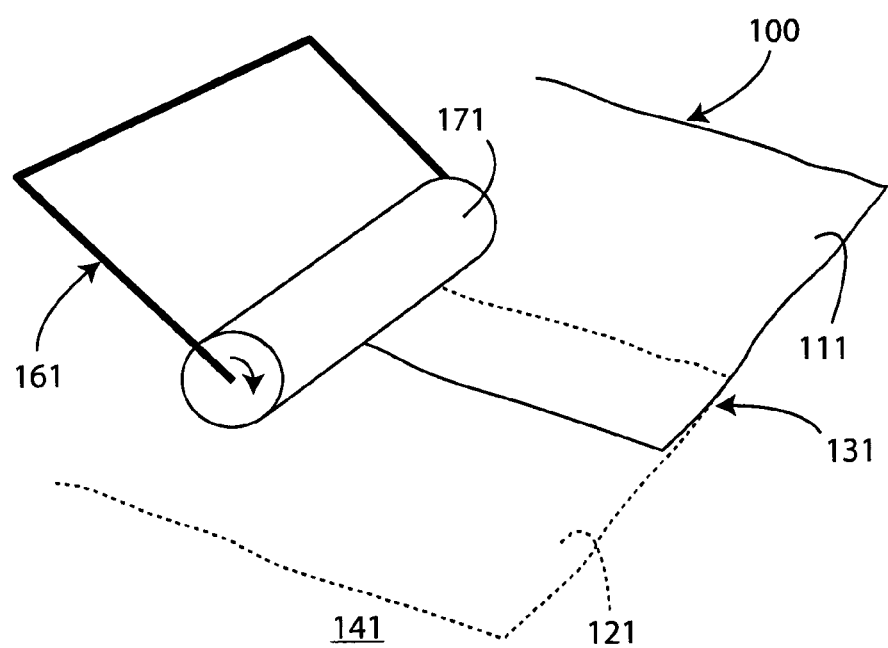
FIG. 8 shows a method for applying two sheets of a synthetic or bituminous membrane by using a heating and connecting device according to the embodiment shown in FIGS. 6 and 7.

According to other embodiments of the invention and with particular reference to figures from 6 to 8, the heating and connecting device according to the invention is used both for the connection of sheets 111, 121 of bituminous or synthetic membranes 100 (possibly gathered in rolls), in correspondence of a lateral or headed edge (selvedge) 131 (as shown in the enclosed FIG. 8), and for a partial or total adhesion of the membrane 100 to the underlying layer 141, even in this case, the system is capable of making waterproof covers, for example of roofs or building foundations.

Also in this case the upper face of the bituminous or synthetic membrane 100 may be made of or coated with adhesive material and may comprise a film covering the upper face and removable from said upper face; the body of the membrane 100 may also include a film of polymeric material which can be chemically connected with bituminous material.

The membrane 100 can be made with a single compound or with an underlying layer made of a simple compound or adhesive bituminous compound and an upper layer made of a known material, such as TPO, APAO, low density or high density polyethylene, isotactic polypropylene, ethylene/propylene copolymer, ethylene/propylene/butene terpolymer, atactic polypropylene, block copolymer of styrene/butadiene/styrene; moreover, all or part of the surface of the membrane 100 may be constituted by a compound with low softening point or by a thermo-adhesive compound and may be provided with lateral and/or headed selvages 131; finally, "Hot-Melt" glues, butyl adhesives, other glues and bituminous or adhesive pastes can be applied on all or part of the surface of the membrane 100, as well as the whole membrane 100 can be reinforced with polyester fabrics, fiber glass fabrics, glass fabrics, composite armors and/or a plurality of armors.

In particular, according to this embodiment of the invention, a flexible conductive material appropriately sized is placed within each sheet 111, 121 of the membrane 100; said material is positioned in correspondence of the portion of the membrane 100 which must be heated and fixed, at least partially, to the substrate 141.

As the conductive material constitutes the heat source for softening the compound placed in the membrane 100, said conductive material is appropriately positioned during the production phase in order to concentrate the heat in a prefixed portion, such as a selvedge 131 or at least a part of the surface of the membrane 100.

For example, if the lower part of the membrane 100 (namely the portion contacting the substrate 141) is heated, said conductive material is positioned towards the bottom of the membrane 100 (i.e. in the direction of the membrane's thickness).

Figure 6:
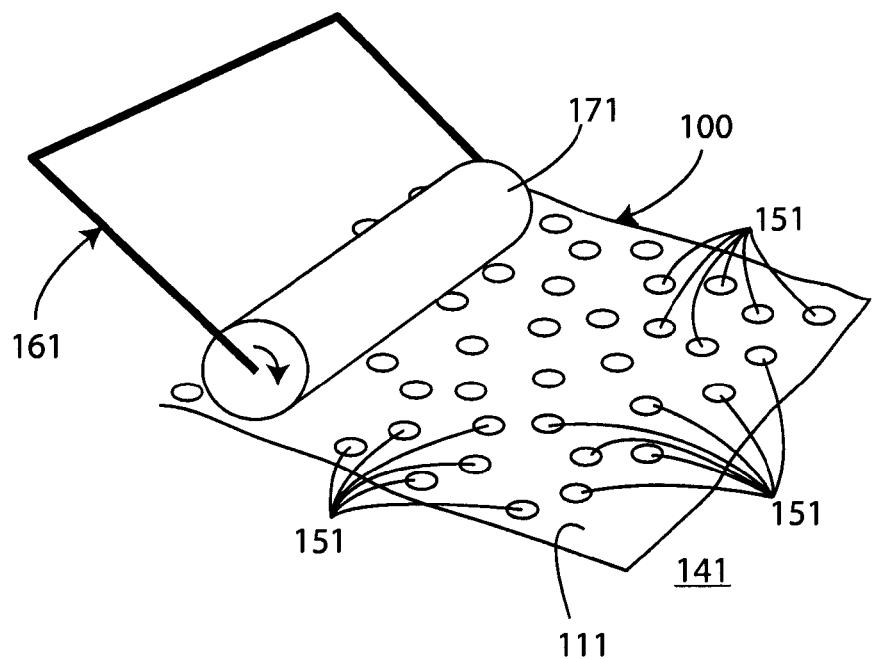
FIG. 6 shows a first method for applying a sheet of a synthetic or bituminous membrane, said membrane being made according to another embodiment of the invention and which includes a heating and connecting device according to the present invention.
Figure 7:
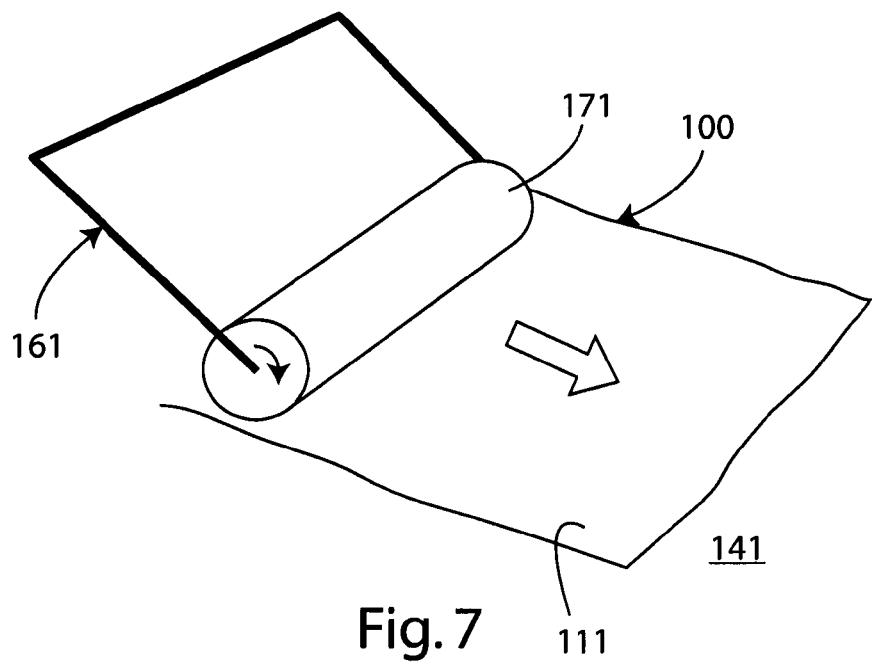
FIG. 7 shows a second method for applying a sheet of a synthetic or bituminous membrane, which is made according to another embodiment with respect to the embodiment of FIG. 6 and which includes a heating and connecting device according to the present invention.

In order to obtain a partial adhesion of the membrane 100 to the underlying substrate 141, the conductive material may be applied with a pattern or layout or design fitting to the surface to be heated (as shown in the enclosed FIG. 6, where the portions of the conductive material are generically indicated with 151).

Said conductive material can be constituted by any conductive material shaped as a continuous sheet or grid and inserted inside the membrane 100 or as a plastic film coated with a conductive material or as an emulsion of conductive powder on a polymeric, aqueous, etc. matrix.

Said conductive material can be applied both in the production phase, by means of different technologies depending on the type of material, and during the laying of the membrane 100.

According to the present embodiment of the invention, therefore, in order to make a covering or a waterproofing layer on a substrate 141, it is possible to appropriately lay the sheets 111, 121 of the membrane 100 with the overlays in a suitable placement to ensure the water resistance and then activate the conductive material which is inserted in the membrane 100 by means of an apparatus 161 including an inductor device 171 (usually made in the form of a roller, able to pass above the membrane 100 during the membrane's laying phase, as shown in the enclosed figures from 6 to 8), which is connected to a relative generator and to a relative control system, which are dimensioned so as to allow the electromagnetic induction heating of the conductive material without affecting the adjacent compound.

The apparatus 161 is powered from the mains power supply which is normally available on site or by any other form of power supply, for example batteries, portable generator, generators, renewable energy, etc., so as to transfer to the inductor device 171 an alternating current with variable frequency between 2 kHz and 1.8 MHz.

The system allows an adaptation of the load to the inductor device 171 in order to transfer the maximum power in the above mentioned range of working frequencies.

The device 161 also provides for replacing the inductor device 171 so as to adapt it to specific applications and/or configuration of the waterproof covering.

The induction heating of the conductive material which is dispersed in the membrane 100 causes therefore the heating of the compound, by thermal conduction, near the conductive material, thus causing the adhesion of the whole membrane 100 or of a portion thereof to the underlying layer 141, which can be constituted by a waterproofing layer or by a previous layer or sheet 111, 121 of a bituminous or synthetic membrane 100 forming a waterproofing multilayer structure.

A perfect welding is thus obtained on the whole surface of the membrane 100 or in correspondence of the surface portions (generically indicated with 151 in the enclosed FIG. 1) where the conductive material is placed; moreover, unlike of what is happening using the self-adhesive membranes (which are generally layered without flame), no disposal waste is produced.

The above system can also be applied for making the technical details of the waterproof layer (for example, vertical joints, drains, vents, emerging bodies, etc.), by using special tools that can be applied to the generator of the inductor device 171.

Since the induction heating allows to localize the heating in correspondence to well-defined surfaces, thus leaving unaltered the surrounding portions, the device according to the invention also allows to precisely control the joining surfaces.

This is particularly relevant when you want to obtain the adhesion of only one portion of the membrane's surface to the support layer 141, in order to facilitate, for example, the diffusion of the water vapour inside the multilayer structure.

In fact, due to the layout design related to the conductive material within the compound of the membrane 100, it is possible to optimize the relationship between the adhesion surface, which is capable of holding the membrane against the wind sucking force, and the upper surface portion (not adhesive), which allows the diffusion of the water vapour.

This result is reproducible at any time.

The same applies in case of total adherence of the membrane 100 to the support layer 141, since, even in said conditions, the result is not influenced by the operator's capability given the fact that the inductor 171 is already sized to provide a suitable power.

Finally, the advancement speed of the inductor device 171 on the membrane 100 is controlled by a control system which is able to automatically move the device 161 or to alert if the temperature of the membrane 100 is higher or lower than a prefixed desired value.

The invention thus conceived is susceptible of numerous modifications and variations, all within the scope of protection of the appended claims.

Moreover, all the technical details may be replaced with other technically equivalent elements and the materials used, as well as the shapes and dimensions of the same, may be varied depending on the requirements and the state of the art.

The invention claimed is:

1. Device for heating and connecting layers of sheets of a bituminous or synthetic membrane (100), where said layers of sheets comprise at least one first sheet (11, 12, 111, 121) of a bituminous or synthetic membrane (100) which includes at least one upper layer of a heated electrically conductive material, selected from the group consisting of ferromagnetic material or a flexible electrical conductor, said bituminous or synthetic membrane being laid to at least one base layer (141) in order to obtain a waterproof covering, said bituminous or synthetic membrane (100) having at least one bottom layer including a bituminous mixture and said at least one upper layer, including a polymeric material, wherein a body (13, 23) being constituted by a film of polymeric material which can be chemically connected with bituminous material and having a mainly longitudinal (A) development is placed on a first edge (11a, 21a) of said first sheet (11, 21, 111, 121) of the bituminous or synthetic membrane (100), in order to connect said first edge to a second edge (12a, 22a) of a second sheet (12, 22, 111, 121) of said synthetic or bituminous membrane (100), said body (13, 23) being provided with an upper face (13a, 23a), which is substantially flat and covered with adhesive material and which comprises a film (16, 26) covering the upper face (13a, 23a) of said body (13, 23) and removable from said upper face (13a, 23a), so that said face contacts said second edge (12a, 22a) of said sheet (11, 12, 21, 22, 111, 121) of the synthetic or bituminous membrane (100), wherein said device comprises an inductor device (171), wherein said inductor device (171) is a single roller, capable of passing above said synthetic or bituminous membrane (100) which is laid to at least one base layer (141) when said layers of bituminous or synthetic membranes are assembled, said roller being connected to a generator and to a control system, adapted to transfer to said inductor device (171) an alternating current with a frequency variable between 2 kHz and 1.8 MHz, to control the advancement speed of said inductor device (171) on said bituminous or synthetic membrane (100) as well as the temperature of individual portions of said electrically conductive material.

2. Device for heating and connecting sheets as claimed in claim 1, wherein said device also comprises at least two electrical resistors (14, 15), forming branches of a electrical circuit, which are mechanically connected to said body (13, 23) and which are placed along said longitudinal direction (A) of said body (13, 23), in order to heat the edges (11a, 12a, 21a, 22a) of said sheets (11, 12, 21, 22, 111, 121) and mutually weld said edges (11a, 21a, 12a, 22a).

3. Device for heating and connecting sheets as claimed in claim 2, wherein said electrical resistors (14, 15) are constituted by a material chosen from an electrically conductive paste, an electrically conductive metallic material and an electrically conductive ink.

4. Device for heating and connecting sheets as claimed in claim 1, wherein said electrically conductive material is constituted by a continuous sheet or grid or by a coated plastic film or by an emulsion of conductive powder placed on a polymer or aqueous matrix or by a paste or by a film.

5. Device for heating and connecting layers of sheets of a bituminous or synthetic membrane (100), where said layers of sheets comprise at least one first sheet (11, 12, 111, 121) of a bituminous or synthetic membrane (100) which includes at least one upper layer of a heated electrically conductive material, selected from the group consisting of ferromagnetic material or a flexible electrical conductor comprising an electrically conductive paste or an electrically conductive ink, said bituminous or synthetic membrane being laid to at least one base layer (141) in order to obtain a waterproof covering, said bituminous or synthetic membrane (100) having at least one bottom layer including a bituminous mixture and said at least one upper layer, including a polymeric material, wherein a body (13, 23) being constituted by a film of polymeric material which can be chemically connected with bituminous material and having a mainly longitudinal (A) development is placed on a first edge (11a, 21a) of said first sheet (11, 21, 111, 121) of the bituminous or synthetic membrane (100), in order to connect said first edge to a second edge (12a, 22a) of a second sheet (12, 22, 111, 121) of said synthetic or bituminous membrane (100), said body (13, 23) being provided with an upper face (13a, 23a), which is substantially flat and covered with adhesive material and which comprises a film (16, 26) covering the upper face (13a, 23a) of said body (13, 23) and removable from said upper face (13a, 23a), so that said face contacts said second edge (12a, 22a) of said sheet (11, 12, 21, 22, 111, 121) of the synthetic or bituminous membrane (100), wherein said device comprises an inductor device (171), wherein said inductor device (171) is a single roller, capable of passing above said synthetic or bituminous membrane (100) which is laid to at least one base layer (141) when said layers of bituminous or synthetic membranes are assembled, said roller being connected to a generator and to a control system, adapted to transfer to said inductor device (171) an alternating current with a frequency variable between 2 kHz and 1.8 MHz, to control the advancement speed of said inductor device (171) on said bituminous or synthetic membrane (100) as well as the temperature of individual portions of said electrically conductive material.

* * * * *